United States Patent [19]

Poterala

[11] Patent Number: 4,601,256

[45] Date of Patent: Jul. 22, 1986

[54] APPARATUS AND METHOD FOR UNIFORMLY COATING AN IRREGULAR WEB

[76] Inventor: Robert J. Poterala, c/o Mascoe Systems Corporation, Box 370, Mauldin, S.C. 29662

[21] Appl. No.: 637,448

[22] Filed: Aug. 3, 1984

[51] Int. Cl.[4] ........................ B05C 1/08; B05C 11/04; B05C 3/18; B29B 1/00

[52] U.S. Cl. .................................... 118/126; 118/248; 118/415; 156/500; 156/538; 100/265

[58] Field of Search ............... 118/253, 677, 692, 248, 118/247; 427/428; 100/50, 163 R, 163 A, 169, 171, 210, 265; 156/231, 238, 242, 246, 580

[56] References Cited

U.S. PATENT DOCUMENTS

| | | | |
|---|---|---|---|
| 2,614,522 | 10/1952 | Snyder | 118/247 |
| 2,842,092 | 7/1958 | Pomper | 118/248 |
| 3,580,771 | 5/1971 | Maffitt | 156/246 |
| 4,253,896 | 3/1981 | Appleyard et al. | 156/231 |

FOREIGN PATENT DOCUMENTS

| | | | |
|---|---|---|---|
| 3016098 | 11/1980 | Fed. Rep. of Germany | 118/692 |

*Primary Examiner*—Edward Kimlin
*Assistant Examiner*—L. Falasco
*Attorney, Agent, or Firm*—Cort Flint

[57] ABSTRACT

An apparatus and method for applying a smooth uniform coating to a web (W) having variations in thickness and density and surface irregularities is disclosed. The invention includes a vertical floating pressure table (B) which supports the traveling web (W) against a transfer roll (20) and a scrape blade (46). Coating material (C) metered by a doctor blade (34) is applied to the transfer roll (20) at (40) and then applied to the web in a uniform layer (78). The pressure table (B) is supported against the web by a counter-balancing linkage arrangement (D) which maintains a constant uniform pressure on the table (B) and web (W) regardless of the vertical movements of a table platform (60) in response to web variations an irregularities. A smooth uniform coating (80) is provided.

9 Claims, 6 Drawing Figures

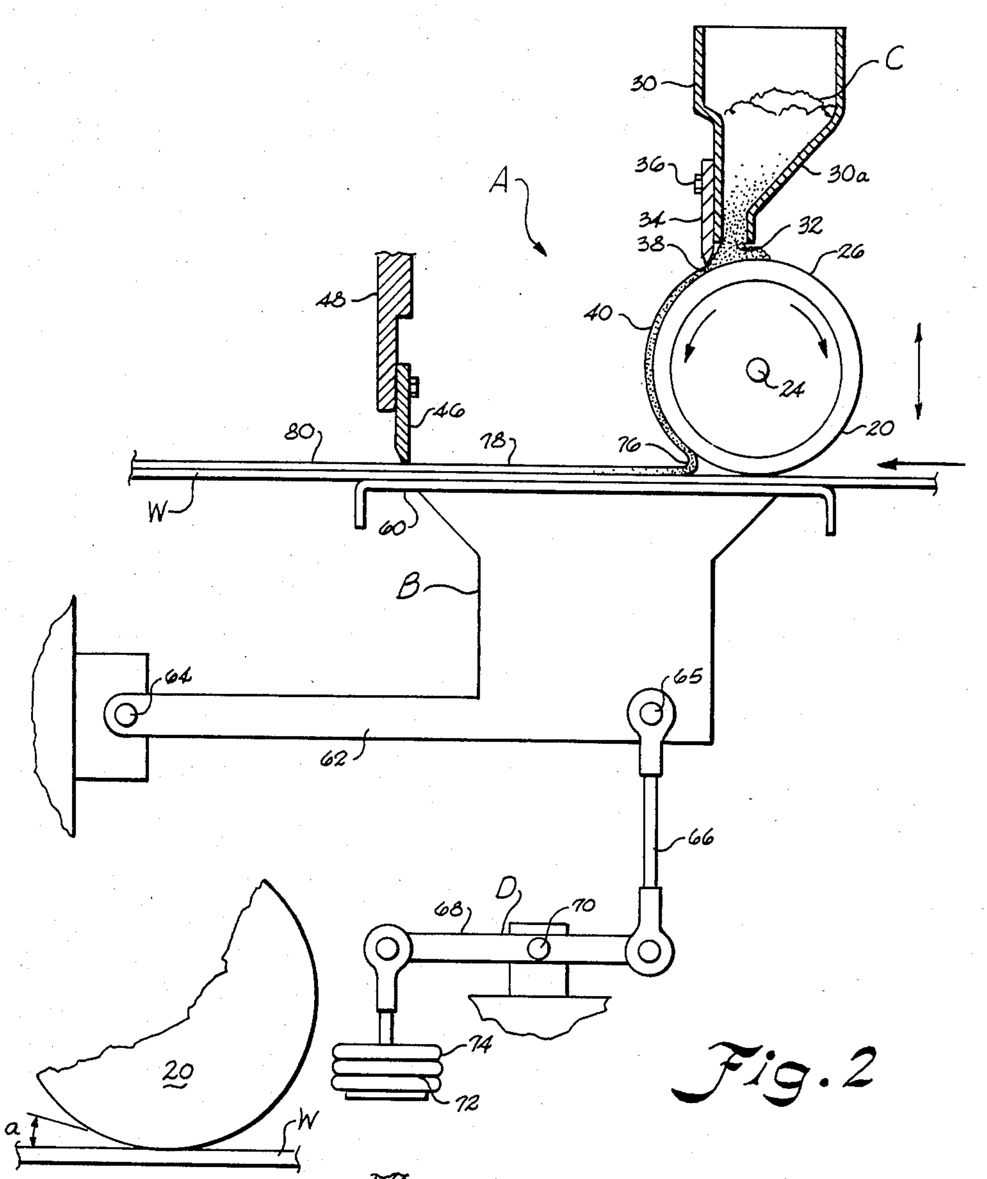
Fig. 2
Fig. 3
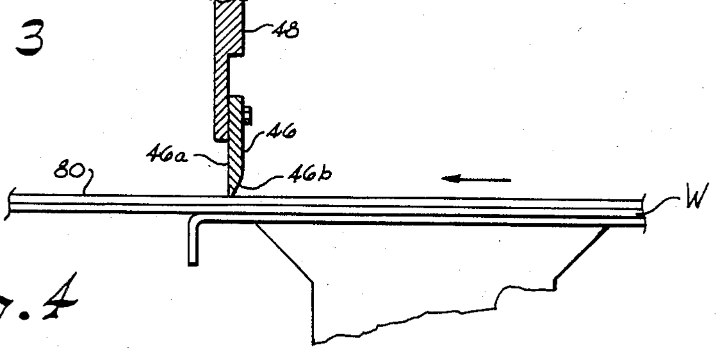
Fig. 4

APPARATUS AND METHOD FOR UNIFORMLY COATING AN IRREGULAR WEB

Heretofore, coating apparatus and methods have been provided which use a blade to spread a coating material over and into the web. Some coating penetrates the web and some remains on the surface to form a molecular bond. However, application of the coating layer varies due to depressions (thin spots) and islands (thick areas) as well as other surface regularities. Various biasing arrangements have been provided for the coating tables of prior apparatus and methods to bias a blade and web together. For example, a foam table has been used to yieldably urge a web and blade which spreads a coating material on the web.

In U.S. Pat. No. 2,614,522 a spring arrangement is shown for yieldably urging a bottom roll against a sheet on which a coating is applied to an upper surface. However, the biasing provided by the spring is non-uniform and larger variations in thickness produce larger biasing forces all of which result in non-uniform coating layers.

Furthermore, if an application roll is used to contact the web and apply coating material, non-uniform forces produced by foam tables and spring arrangements cause deviations in the contact angle between the web and application roll. The angle of contact between the web and application roll directly influences the coating construction. In the case of spreading with a scrape blade, the amount of pressure between the blade and web also determines the coating construction. Any variations in web thickness and density and any surface irregularities cause variations in angles of contact and blade pressures. The non-uniform biasing arrangements used heretofore have not been able to provide smooth uniform coating for webs having thickness and density variations and surface irregularities.

According an important object of the present invention is to provide an apparatus and process for applying a smooth uniform coating to a web having density and thickness variations and surface irregularities.

Another important object of the present invention is to provide a method and apparatus for coating a web having variations and irregularities in its surface wherein the web is supported during coating so that a uniform pressure is exerted between the web and a scrape blade during coating.

Still another important object of the present invention is to contact a traveling web having thickness variations and irregularities in its surface against a coating transfer roll with even pressure so that a constant angle of contact between the web and roll results.

SUMMARY OF THE INVENTION

The above objectives are accomplished according to the present invention by providing a coating apparatus having a vertically floating pressure table which supports a traveling web beneath a transfer roll and scrape blade downstream of the transfer roll. The floating pressure table is counter-balanced and carried by the coating machine frame so that uniform pressures are exerted between the web and transfer roll and web and scrape blade regardless of the vertical movement of the pressure table in response to thickness variations and surface irregularities in the web. A generally constant contact angle is provided between the transfer roll and web. By applying the coating material to the transfer roll at a constant contact angle, the material is applied to the web in a uniform layer. The coating material is then spread over and into the web by the downstream scrape blade. The blade is maintained in constant uniform pressure with the web by the floating pressure table. A smooth uniform coating construction results for a web having density and thickness variations and surface irregularities.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a schematic elevation illustrating a coating apparatus and method according to the invention.

FIG. 3 is a schematic illustration of a contact angle between a coating application roll and web being coated;

FIG. 4 is a schematic view illustrating a reversed scrape blade in accordance with the coating apparatus and method of the present invention;

DESCRIPTION OF A PREFERRED EMBODIMENT

Figure 1:
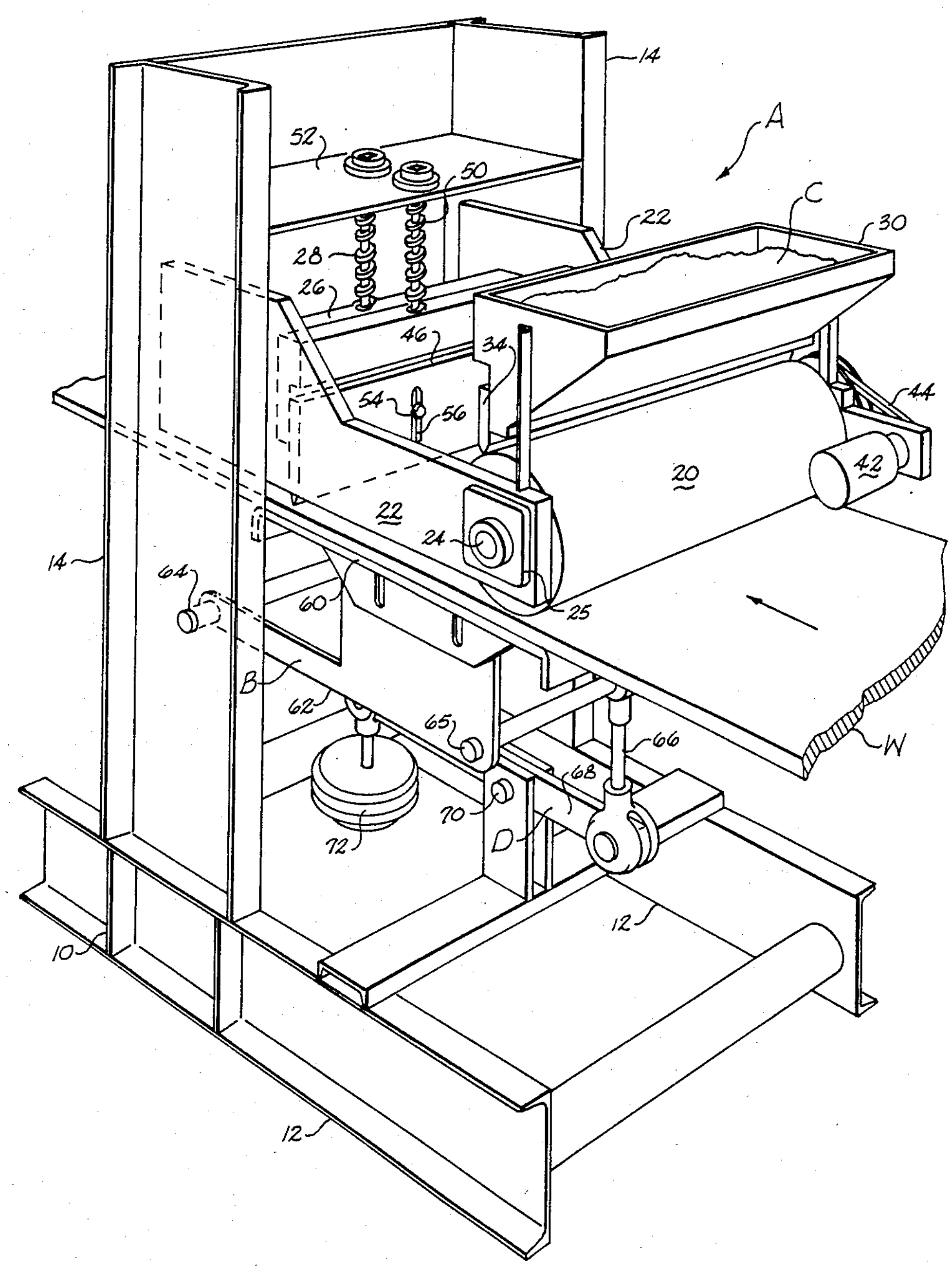
FIG. 1 is a perspective view illustrating a coating apparatus and method according to the invention.

The invention relates to coating a variable thickness and irregular web in such a manner that a smooth uniform coating layer is applied.

Referring in more detail to the drawings, a coating apparatus, designated generally as A, is disclosed which comprises a frame 10 including main base flanges 12 and vertical standards 14 affixed and braced in any suitable manner such as by welding and the like. A web W is delivered, conveyed, or otherwise caused to pass through the apparatus by any conventional manner such as a traveling belt conveyor or feed rolls. Web W moves from right to left through the coating apparatus as viewed in the drawings.

As can best be seen in FIG. 1, there is a transfer roll 20 carried by arms 22 of the frame having a shaft 24 which is journaled in bearings 25 carried by the frame 10. The arms 22 are carried by a plate 26 which is moved vertically by a screw 28 journaled in a plate 52 secured to the frame 10 so that the height of roll 20 may be adjusted. The screw 26 is threadably connected to the plate 28. Of course, other methods and structures for adjusting the position of the transfer roll 20 on frame 10 may be employed as is well known to the average artisan.

Above the transfer roll is an application means for applying a coating material C to the transfer roll which includes a reservoir 30 having an outlet 32. The reservoir trough is shaped at 30*a* to retain the material C and prevent application to the back side of roll 20. There is an adjustable doctor blade 34 carried by the reservoir 30 as a unit to doctor the transfer roll and meter the amount of coating material C applied to the transfer roll. The doctor blade 34 is affixed by bolts 36, and vertical slots (not shown) may be formed in the blade to receive the bolts so that its vertical position may be adjusted. By adjusting the height of the doctor blade, a gap 38 may be varied to control the amount of coating material C applied to the transfer roll. In this manner, the thickness of a layer 40 formed on the transfer roll may be controlled.

Transfer roll 20 may be driven in a forward clockwise position, a reverse counter-clockwise position, or may be used in an idle mode. Any suitable drive for roll 20 may be provided such as a reversible electric motor 42 with either a direct or belt drive 44 as can best be seen in FIG. 1.

There is a scrape blade 46 carried downstream of transfer roll 20 on the frame which spreads the coating material C over the upper side of the web W and scrapes it into the web. The blade 46 is carried on a vertically adjustable assembly block 48 which varies the height of the blade above the web. Screw 50 is journaled in the plate 52 carried on frame 10 and is threadably received in the assembly block 48 to raise and lower the assembly block and blade. Blade 46 may also be adjustably mounted and reverse mounted (FIG. 4) on block 48 by bolts 54 and vertical slots 56 in the blade 46. The sides of arms 22 may be grooved so the ends of block 48 slide in vertical grooves and is stabilized. As can best be seen in FIGS. 2 and 4, blade 46 can be reversed so that either its straight side edge **46*a* or its beveled side edge 46*b*** scrapes and spreads the coating material C onto and into the web to fit the needs of certain applications.

Referring now to FIGS. 1 and 2, a means for regulating the pressure of the web W against both the transfer roll 20 and scrape blade 46 is illustrated as including a vertically floating pressure table B in the form of a web support table 60. A table support arm 62 is pivotally attached at 64 to the frame 10 and supports the web table 60. Web table 60 is illustrated in the form of a generally horizontal platform over which web W travels. The platform coextends beneath transfer roll 20 and blade 46 as well as across the width of the web. It is contemplated that other constructions for the platform may also be had in accordance with the invention.

A counter-balance means D is connected to the table arm 62 and includes a vertical linkage 66 pivotally connected to arm 62 at one end 65 and to a counter-balance linkage 68 at another end. Linkage 68 pivots about a counter-balance shaft 70 carried by frame 10. There is an adjustable weight assembly 72 carried at the distal end of linkage 68 to which more or less weight 74 can be added to adjust the pressure applied to and by the pressure table B as required by web conditions and surface finish.

The vertical floating pressure table B supports the web W against the transfer roll 20 and scrape blade 46 with a consistent uniform pressure regardless of the direction of vertical movement of the table due to variations in the web thickness and density and surface irregularities. Variations include depressions and islands in the web surfaces which blade 46 is made to follow with uniform and consistent pressure, as does transfer roll 20.

As can best be seen in FIG. 3, transfer roll 20 contacts the web W at an angle "a" which will remain constant as the pressure between the web and roll surface remain constant. The coating material C forms a well 76 of material at the nip of the roll and web. By maintaining the contact angle "a" constant, the amount of material in the well is maintained constant and the resulting layer 78 of coating material applied to the web by the transfer roll is kept uniform.

When the pressure between the web W and scrape blade 46 is kept uniform and consistent by floating pressure table B, this uniform layer 78 is evenly spread over and into the web whereby a smooth and uniform coating layer 80 is applied to the web in accordance with the apparatus and method of the present invention. These two factors, contact angle "a" and scrape blade pressure, determine the coating construction, in addition to the density and web speed. By making these two factors in the coating apparatus and process constant and uniform, a uniform coating penetration and molecular bonding is provided.

In accordance with the method, a traveling web W is made to contact a transfer roll 20 to which a metered amount of coating material C is applied. Next, the web contacts a scrape blade 46 which spreads a uniform coating layer 78 onto and into the web. At all times during contact with the roll and blade, the web is supported with uniform pressure against the roll and blade regardless of thickness and density variations in the web and surface irregularities.

Figure 5:
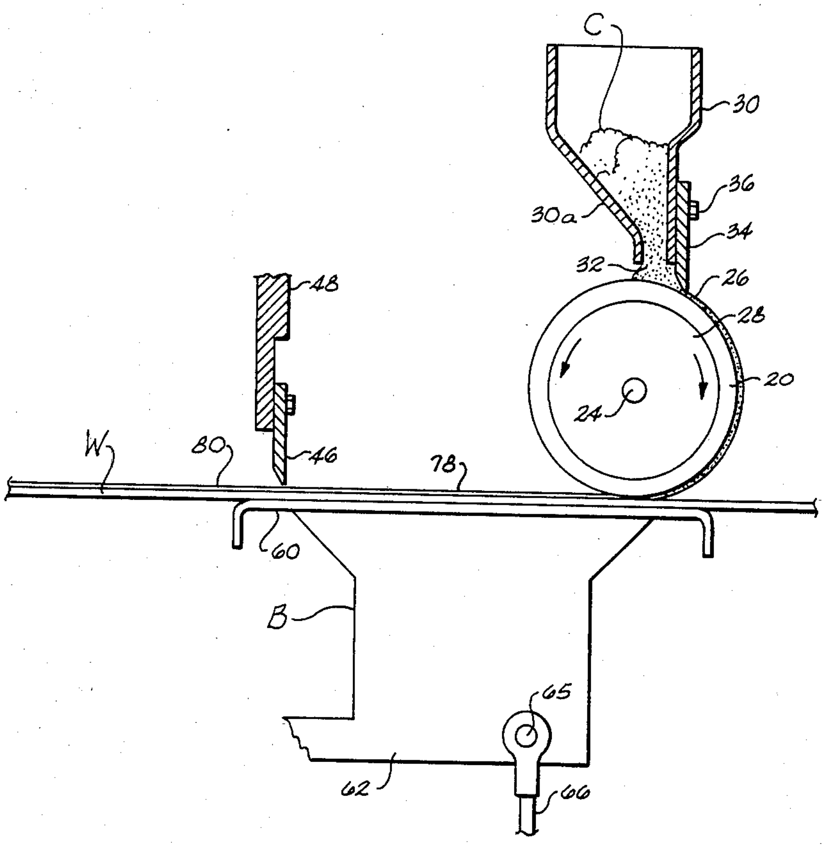
FIG. 5 is a elevation in part of a coating apparatus and method of the present invention with the coating material being applied to a transfer roll driven in a reverse direction.

In accordance with the method, transfer roll 20 may be driven in the forward direction in which case the web coating layer 78 is determined by the difference in speed between the web and roll and the gap setting of blade 34. Roll 20 may by allowed to idle in the forward direction in which case the amount of material applied is determined by the gap setting of blade 34. As can best be seen in FIG. 5, transfer roll 20 can also be driven in a reverse direction in which case the reservoir unit 30 is reversed. Again, in this case, the amount of coating is determined by the differences in speed between the web and roll and the gap setting of blade 34.

Figure 6:
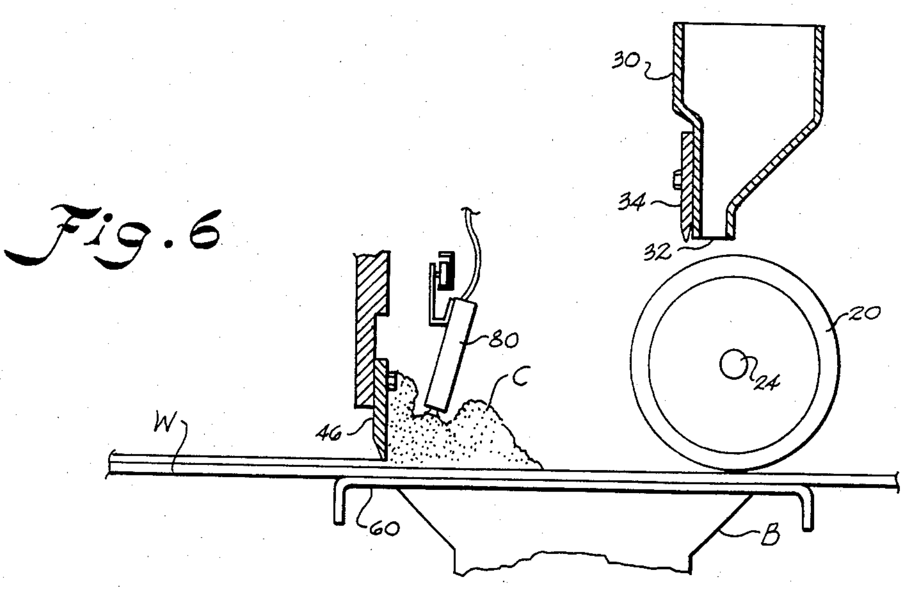
FIG. 6 is a partial elevation illustrating a coating apparatus and method according to the present invention wherein coating material is applied in an alternate manner.

For applying thick layers, transfer roll 20 is allowed to contact the web and is forward driven (FIG. 6). However, no coating material is applied to the transfer roll. Scrape blade 46 is raised, for example one inch above the web. Coating material C is dispersed behind the blade 46 by a laterally moving pipe 80 which transverses the web W, as can best be seen in FIG. 6. The material C bunches up behind the blade but passes under it to be evenly applied. In this case, roll 20 acts solely as a hold-down point to prevent the web from bunching up behind the blade. Any suitable arrangement for moving the pipe 80 back and forth behind the blade may be utilized as is well within the skill of the average artisan.

While the apparatus of FIG. 1 illustrates a fairly narrow width construction of the apparatus, widths of one hundred inches are contemplated in typical use.

While a preferred embodiment of the invention has been described using specific terms, such description is for illustrative purposes only, and it is to be understood that changes and variations may be made without departing from the spirit or scope of the following claims.

What is claimed is:

1. Apparatus for coating a web of material with a coating medium comprising:

a frame;

a vertically moving pressure table carried by said frame for supporting said web being coated in up or down vertical directions;

a transfer roll carried adjacent said pressure table for applying said coating medium to said web passing over said pressure table;

application means for applying said coating medium to said transfer roll;

a vertically adjustable scrape blade carried by said frame downstream of said transfer roll adjacent said pressure table for contacting said web to cause spreading of said coating medium over said web and penetration into said web;

said pressure table generally coextending beneath said transfer roll and said scrape blade means in length and across at least the width of said web in a manner that said pressure table uniformly urges said web against said scrape blade and said transfer roll;

adjustable counterbalance means including a counter balanced linkage arm pivotably connected to said pressure table and said frame for exerting a constant uniform counterbalancing force on said pressure table in said up or down vertical directions in a manner in which a web having thickness and density variations traveling over said pressure table is held against said scrape blade and said transfer roll with constant and uniform pressure regardless of whether said pressure table moves vertically up or down in response to said thickness and density variations and surface irregularities in said web;

a weight assembly connected to said counterbalanced linkage arm in a manner that a desired amount of said counter balancing force may be applied to said pressure table in a counter balancing manner, whereby a smooth and uniform coating is applied to said web regardless of said variations and irregularities.

2. The apparatus of claim 1 wherein said counterbalance means includes a generally vertical linkage arm pivotally connected to said table arm and to a linkage arm, a counterbalance shaft carried by said frame, said counterbalanced linkage arm being pivoted about said counterbalance shaft and said counterbalanced linkage arm having a free end adapted for carrying an said weight assembly.

3. The apparatus of claim 1 wherein said application means includes a reservoir carried adjacent said transfer roll having an outlet through which said coating medium is applied to said roll.

4. The apparatus of claim 1 wherein said application means includes a doctor blade for doctoring said transfer roll and metering the amount of coating medium applied on said transfer roll and means adjustably mounting said doctor blade in proximity to the surface of said transfer roll.

5. The apparatus of claim 3 wherein said application means includes an adjustable doctor blade carried in proximity to said transfer roll for doctoring said roll and metering the amount of coating material applied to the roll.

6. The apparatus of claim 5 wherein said reservoir and doctor blade are carried as a unit and said unit may be reversed in its position one hundred and eighty degrees relative to said web travel whereby said doctor blade may be located upstream or downstream of said web relative to said reservoir outlet.

7. The apparatus of claim 1 wherein said scrape blade includes a generally straight side edge and a beveled side edge, and reversible mounting means mounting said scrape blade so that either of said straight or beveled side edges face upstream.

8. The apparatus of claim 1 including distribution means carried adjacent said scrape blade for applying said coating medium behind said scrape blade on an upstream side thereof.

9. The apparatus of claim 1 wherein said transfer roll may be driven in forward or reverse directions.

* * * * *